(12) United States Patent
Shin et al.

(10) Patent No.: US 10,745,042 B2
(45) Date of Patent: Aug. 18, 2020

(54) STEERING APPARATUS FOR VEHICLE

(71) Applicant: MANDO CORPORATION, Gyeonggi-do (KR)

(72) Inventors: Woo Jin Shin, Gyeonggi-do (KR); TaeHyun Sung, Seoul (KR); Suk Hee Lee, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 59 days.

(21) Appl. No.: 16/223,089

(22) Filed: Dec. 17, 2018

(65) Prior Publication Data
US 2019/0185041 A1    Jun. 20, 2019

(30) Foreign Application Priority Data

Dec. 19, 2017  (KR) .................... 10-2017-0174868
Dec. 19, 2017  (KR) .................... 10-2017-0174884
Mar. 19, 2018  (KR) .................... 10-2018-0031345

(51) Int. Cl.
*B62D 1/181*    (2006.01)
*B62D 1/184*    (2006.01)
(Continued)

(52) U.S. Cl.
CPC ............. *B62D 1/181* (2013.01); *B62D 1/04* (2013.01); *B62D 1/06* (2013.01); *B62D 1/183* (2013.01); *B62D 1/184* (2013.01); *B62D 1/185* (2013.01)

(58) Field of Classification Search
CPC .......... B62D 1/181; B62D 1/185; B62D 1/06; B62D 1/04; B62D 1/184; B62D 1/183
See application file for complete search history.

(56) References Cited

U.S. PATENT DOCUMENTS 3,302,478 A  *  2/1967  Pauwels ................. B62D 1/183
                                                              74/493
3,396,600 A  *  8/1968  Zeigler .................. B62D 1/183
                                                              74/493
(Continued)

FOREIGN PATENT DOCUMENTS

JP         1-111566        4/1989
JP      2003-272487        9/2003
(Continued)

OTHER PUBLICATIONS

Office Action dated May 2, 2019 for Korean Patent Application No. 10-2018-0031345 and its English machine translation by Google Translates.

*Primary Examiner* — Drew J Brown
(74) *Attorney, Agent, or Firm* — Ladas & Parry, LLP

(57) ABSTRACT

According to embodiments of the present disclosure, there is provided a steering apparatus for a vehicle, the steering apparatus including: a steering wheel including a housing connected to a upper steering shaft of the vehicle and having a first opening and a second opening on both sides, a first movable partial wheel and a second movable partial wheel configured to be inserted into and protruded out of the housing through the first opening and the second opening, and a wheel actuator disposed in the housing and combined with the first movable partial wheel and the second movable partial wheel to provide a driving force; and a steering column including an inner cover shaft having an end coupled to an end of an upper steering shaft, an inner housing coupled to an end of the inner cover shaft and having a guide protrusion on the outer side thereof, a control housing having a guide hole axially formed to receive the (Continued)

guide protrusion, and a cover housing in which the control housing is rotatably inserted and that is fixed to a car body of the vehicle.

20 Claims, 23 Drawing Sheets

(51) Int. Cl.
    *B62D 1/183*      (2006.01)
    *B62D 1/06*      (2006.01)
    *B62D 1/04*      (2006.01)
    *B62D 1/185*      (2006.01)

(56) References Cited

U.S. PATENT DOCUMENTS

| | | | |
|---|---|---|---|
| 4,900,059 A * | 2/1990 | Kinoshita | B62D 1/181 |
| | | | 280/775 |
| 5,722,300 A * | 3/1998 | Burkhard | B62D 1/185 |
| | | | 280/775 |
| 2007/0126222 A1 * | 6/2007 | Koya | B62D 1/185 |
| | | | 280/775 |
| 2009/0065285 A1 * | 3/2009 | Maeda | B60K 37/00 |
| | | | 180/400 |
| 2015/0090067 A1 * | 4/2015 | Iwakawa | B62D 1/181 |
| | | | 74/493 |
| 2017/0120944 A1 * | 5/2017 | Kato | B62D 1/181 |
| 2018/0072339 A1 * | 3/2018 | Bodtker | B62D 5/001 |
| 2018/0079441 A1 * | 3/2018 | McKinzie | B62D 1/04 |
| 2018/0148084 A1 * | 5/2018 | Nash | F16C 3/03 |
| 2018/0251147 A1 * | 9/2018 | Heitz | B62D 1/181 |
| 2018/0319419 A1 * | 11/2018 | Kreutz | B62D 1/183 |
| 2019/0016365 A1 * | 1/2019 | Swamidason | B62D 5/006 |
| 2019/0152509 A1 * | 5/2019 | Casini | B62D 1/187 |
| 2019/0168798 A1 * | 6/2019 | Wojtalik | B62D 1/185 |
| 2019/0176868 A1 * | 6/2019 | Kreutz | B62D 1/08 |
| 2019/0185042 A1 * | 6/2019 | Lee | B62D 1/181 |

FOREIGN PATENT DOCUMENTS

| | | |
|---|---|---|
| KR | 10-2007-0121127 | 12/2007 |
| KR | 10-1836711 | 3/2018 |

* cited by examiner

STEERING APPARATUS FOR VEHICLE

CROSS REFERENCE TO RELATED APPLICATIONS

This application claims priority to Korean Patent Application No. 10-2017-0174884 filed on Dec. 19, 2017, Korean Patent Application No. 10-2017-0174868 filed on Dec. 19, 2017, and Korean Patent Application No. 10-2018-0031345 filed on Mar. 19, 2018, which are hereby incorporated by reference for all purposes as if fully set forth herein.

BACKGROUND

1. Technical Field

Embodiments of the present disclosure relate to a steering apparatus for a vehicle. In more detail, various exemplary embodiments of the present disclosure relate to a steering apparatus for a vehicle, which enables a driver to more widely use the space around the driver's seat because a steering column can be contracted into and stretched out of a dashboard in accordance with the necessity of the driver and movable partial wheels of the steering wheel can be inserted into and protruded out of the steering wheel in a driver-driving mode and a self-driving mode.

2. Description of Related Art

In general, an automotive steering apparatus includes a steering wheel through which operation is input from a driver and a steering column connected to the steering wheel and is fixed to the car body of a vehicle, and a telescopic device or a tilting device etc. are added for the convenience of a driver.

The telescopic device is a device allowing a steering column to axially stretch and contract and a tilting device is a device for adjusting the angle of a steering column.

However, according to such automotive steering apparatuses, the steering wheel can only be moved to be optimized for driving simply in accordance with the body shapes of drivers, so they have large limitation that drivers cannot more widely use the space around the driver's seat, if necessary, when they do not drive.

In particular, recently, as self-driving vehicles are more actively studied and developed, there is a demand for a structure that can stretch and contract a steering column and a steering wheel which allows expanded use of the space around a driver's seat in a self-driving mode. Thus development of such a technology is necessary.

SUMMARY

In this background, an aspect of the present disclosure is to provide a steering apparatus for a vehicle. According to the steering apparatus, in accordance with necessity of a driver, a steering column is protruded out of a dashboard and a steering wheel is moved to a position where it can be operated by the driver or, the steering column is inserted into the dashboard and the steering wheel is moved close to the dashboard. Further, movable partial wheels of a steering wheel are protruded out of the steering wheel in a driver-driving mode, so a driver can steer a vehicle with the movable partial wheels in hand. In addition, movable partial wheels are stowed in a steering wheel in a self-driving mode, so a driver can more widely use the space around the driver's seat.

Further, the present disclosure is not limited to the aspect described above, and other unmentioned aspects of the present disclosure may be clearly appreciated by those skilled in the art from the following descriptions.

In view of the above aspect, embodiments of the present disclosure provide a steering apparatus for a vehicle, the steering apparatus including: a steering wheel including a housing connected to a upper steering shaft of the vehicle and having a first opening and a second opening on both sides, a first movable partial wheel and a second movable partial wheel configured to be inserted into and protruded out of the housing through the first opening and the second opening, and a wheel actuator disposed in the housing and combined with the first movable partial wheel and the second movable partial wheel to provide a driving force; and a steering column including an inner cover shaft having an end coupled to an end of an upper steering shaft, an inner housing coupled to an end of the inner cover shaft and having a guide protrusion on the outer side thereof, a control housing having a guide hole axially formed to receive the guide protrusion, and a cover housing in which the control housing is rotatably inserted and that is fixed to a car body of the vehicle.

According to these embodiments, in accordance with the necessity of a driver, a steering column is protruded out of a dashboard and a steering wheel is moved to a position where it can be operated by the driver or, the steering column is inserted into the dashboard and the steering wheel is moved close to the dashboard. Further, movable partial wheels of a steering wheel are protruded out of the steering wheel in a driver-driving mode, so a driver can steer a vehicle with the movable partial wheels in hand. In addition, movable partial wheels are stowed in a steering wheel in a self-driving mode, so a driver can more widely use the space around the driver's seat.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
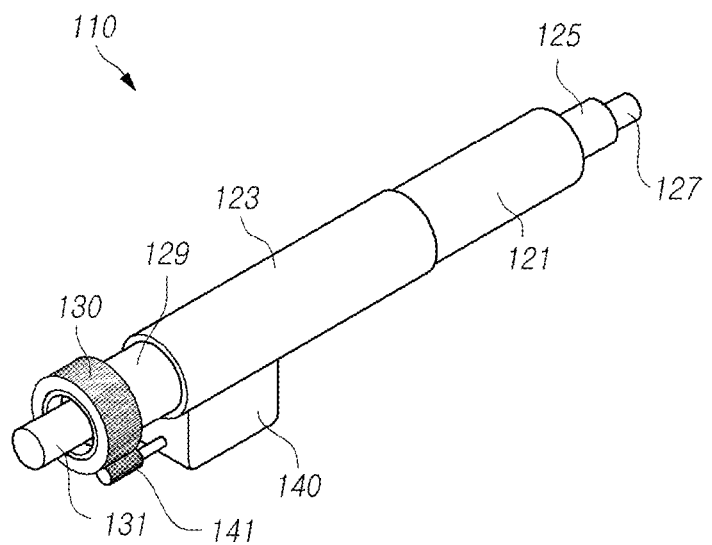
FIGS. 1 and 2 are perspective views showing a portion of a steering column according to embodiments of the present disclosure.
Figure 2:
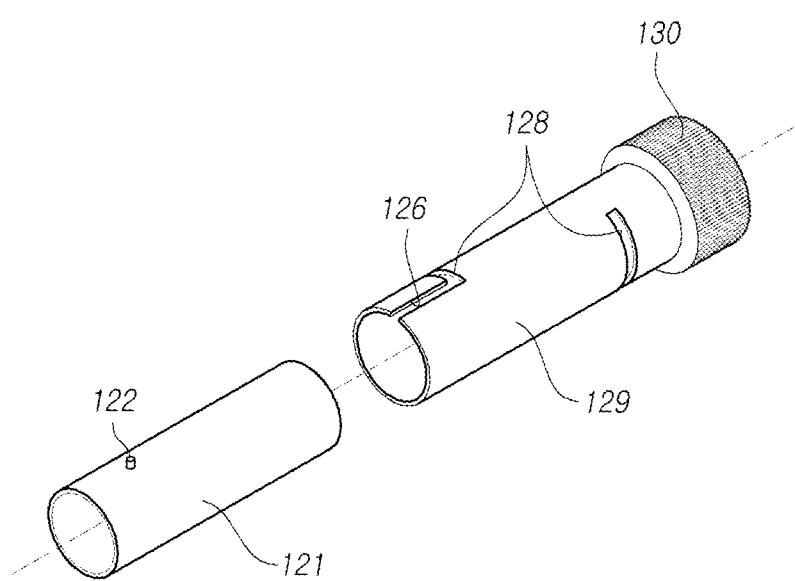
Figure 3:
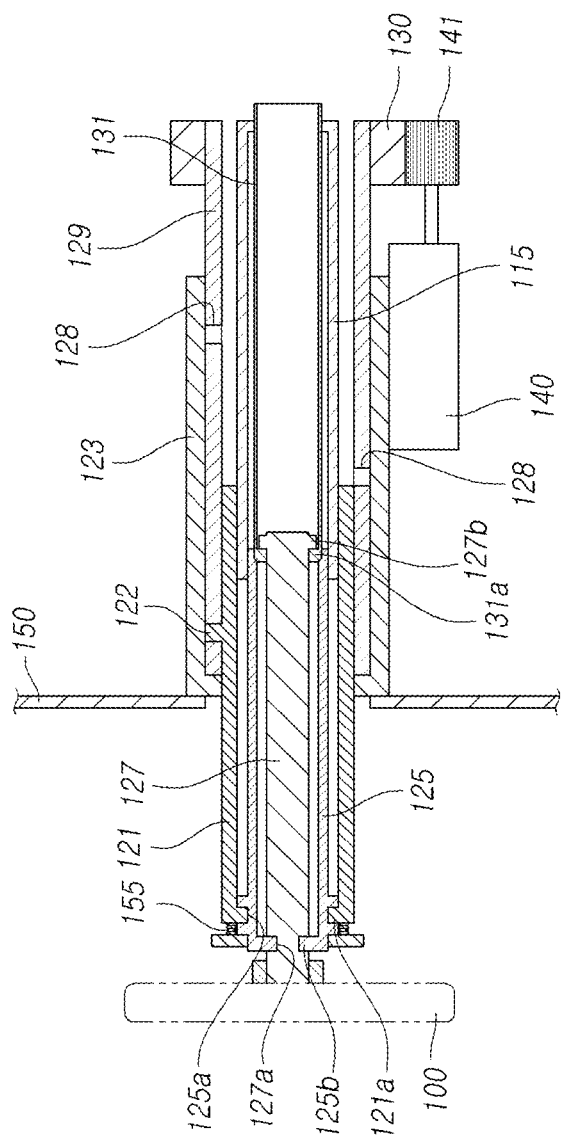
FIGS. 3 and 4 are cross-sectional views showing examples of stretching and contracting a steering column according to embodiments of the present disclosure.
Figure 4:
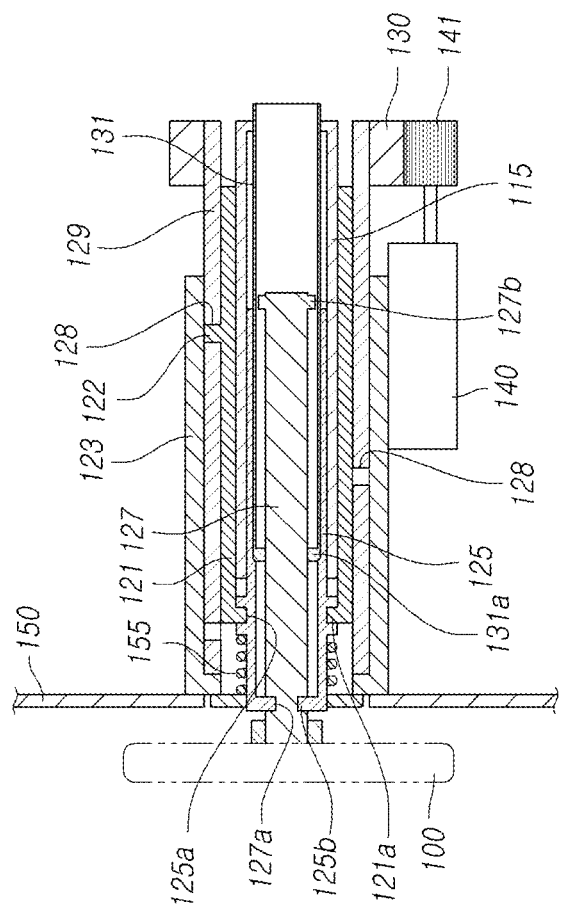

Hereinafter, aspects of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

As shown in FIGS. 1 to 23, a steering apparatus for a vehicle according to exemplary embodiments of the present disclosure may include a steering wheel and a steering column.

Referring to FIGS. 1 to 5 first, a steering column 110 may include: an inner cover shaft 125 having an end coupled to an end of an upper steering shaft 127; an inner housing 121 coupled to an end of the inner cover shaft 125 and having a guide protrusion 122 on the outer side of the inner housing 121; a control housing 129 having a spiral guide hole or slit 128 axially formed to receive the guide protrusion 122; and a cover housing 123 in which the control housing 129 is rotatably inserted and that may be installed or fixed to any appropriate portion of the car body of a vehicle.

In the description of embodiments of the present disclosure, when the direction about the steering column 110 is described, the direction toward the steering wheel 100, that is, the extraction direction of the steering column 110 goes to an end and the insertion direction of the steering column 110 that is the opposite direction goes to the other end.

The steering column 110 may have a structure that is axially stowed while being axially contractible or stretchable.

For example, the steering column 110 may axially contract into the cover housing 123 from the steering wheel 100 with respect to the cover housing 123 fixed to the car body of a vehicle, so the steering wheel 100 comes close to a dashboard 150 of the vehicle or axially protrudes.

According to embodiments of the present disclosure, the upper steering shaft 127 may be axially slidable into or out of a lower steering shaft 131 and the inner cover housing 121 coupled or combined with the upper steering shaft 127 slides over or off (or into or out of) an outer cover shaft 115.

The inner housing 121 coupled or combined with the inner cover shaft 125 be axially movable, for example, such that the inner housing 212 can slide into or out of the control housing 129.

One end of the inner cover shaft 125 may be coupled to one end of the upper steering shaft 127. Therefore, when the inner cover shaft 125 is axially inserted into or taken out from the lower steering shaft 131, the inner cover shaft 125 may move the upper steering shaft 127 into or out of the lower steering shaft 131.

The inner housing 121 may be coupled to an end of the inner cover shaft 125 and may have the guide protrusion 122 on the outer side. The control housing 129 has the spiral guide hole 128 axially formed to receive the guide protrusion 122 of the inner housing 121. When the control housing 129 is rotated, the inner housing 121 may move in an axial direction or may axially slide.

The cover housing 123 fixed to the car body 142 of a vehicle may support the rotation of the control housing 129 rotatably inserted in the cover housing 123, and a driving motor 140 that can rotate the control housing 129 is coupled to the other end of the cover housing 123.

A first gear 130 may be disposed at the other end of the control housing 129 and be rotatably connected to the control housing 129. A second gear 141 may be coupled to or formed on the shaft of the driving motor 140 and may be rotatably connected to the first gear 130 of the control housing 129 to rotate the first gear 130. When the control housing 129 is rotated in a first direction or a second direction depending on the operation direction of the driving motor 140, the inner housing 121, the inner cover shaft 125, and the upper steering shaft 127 correspondingly slide in or out.

For example, the first gear 130 of the control housing 129 may be a worm wheel and the second gear 141 of the driving motor 140 may be a worm. However, the first gear 130 can be any type of gears or means for transmit the rotation force of the driving motor 140. Alternatively, the driving motor 130 can be directly coupled to the control housing 129 to rotate the control housing 129.

Further, a connection slit or hole 126 may be axially connected with the guide hole 128. The connection slit or hole 126 may be formed at an end of the control housing 129 so that the connection hole 126 enables the guide protrusion 122 to be easily inserted into the guide hole 128 when the inner housing 121 and the control housing 129 are assembled together.

A fixing protrusion 125b may protrude radially inward. The fixing protrusion 125b may be formed at an end of the inner cover shaft 125. A fixing groove 127a in which the fixing protrusion 125*b* of the inner cover shaft 125 is inserted may be formed at an end of the upper steering shaft 127.

An end of the upper steering shaft 127 may be coupled to the steering wheel 100, so that the inner cover shaft 125, the upper steering shaft 127, and the steering wheel 100 can axially slide inward or outward together.

However, although the fixing protrusion 125*b* may be formed at the inner cover shaft 125 and the fixing groove 127*a* may be formed at the upper steering shaft 127, the present disclosure is not limited to this structure. For instance, the fixing protrusion 125*b* may be formed at the upper steering shaft 127 and the fixing groove 127*a* may be formed at the inner cover shaft 125.

A locking protrusion 121*c* may protrude radially inward and be formed at an end of the inner housing 121. A locking groove 125*a* may be formed at end of the inner cover shaft 125 and the locking protrusion 121*a* of the inner housing 121 may be coupled to the locking groove 125*a* so that the inner housing 121 and the inner cover shaft 125 can move or slide together.

However, although the locking groove 125*a* may be formed at the inner cover shaft 1125 and the locking protrusion 121*a* may be formed at the inner housing 121, the present disclosure is not limited thereto. For example, the locking protrusion 121*a* may be formed at the inner cover shaft 125 and the locking groove 125*a* may be formed at the inner housing 121. Further, instead of grooves and protrusions, the inner housing 121 and the inner cover shaft 125 can have any structure or means which can couple the inner housing 121 and the inner cover shaft 125.

The steering column 110 may further include an outer cover shaft 115. The outer cover shaft 115 may have an end movably coupled to both the inner cover shaft 125 the inner housing 121 such that the inner cover shaft 125 and the inner housing 121 can axially move or slide with respect the outer cover shaft 115.

The outer cover shaft 115 has an end supported by the inner cover shaft 125 and the inner housing 121 and the other end supported by the lower steering shaft 131 to support axial sliding movement of the inner cover shaft 125.

The steering column 110 may further include the lower steering shaft 131. The lower steering shaft 131 may be disposed or inserted in the outer cover shaft 115. The lower steering shaft 131 may have an end disposed or inserted in the upper steering shaft 127 and the other end supported by the outer cover shaft 115 such that the upper steering shaft 127 can axially move or slide with respect to the lower steering shaft 131.

An upper stopper 131*a* may be formed at an end of the lower steering shaft 131 and a lower stopper 127*b* corresponding to the upper stopper 131*a* may be formed at an end of the upper steering shaft 127 (e.g. an end of the upper steering shaft 127 which is positioned opposite to the other end of the upper steering shaft 127 coupled to the steering wheel 100) so that separation of the upper steering shaft 127 from the lower steering shaft 131 can be prevented and the sliding distance or movement of the upper steering shaft 127 can be limited during the sliding movement of the upper steering shaft 127.

A cover pad 117 may be disposed on the outer side of the inner cover shaft 125. The cover pad 117 and the inner housing 121 may be connected through an elastic member 155. When the inner housing 121 slides into the control housing 129, the cover pad 117 may be stopped or supported by an end of the cover housing 123.

For example, when the upper steering shaft 127 and the inner cover shaft 125 are taken out from the dash board 150, the extraction of the steering wheel 100 and/or steering column 110 can be finished with or limited by the lower stopper 127*b* of the upper steering shaft 127 and the upper stopper 131*a* of the lower steering shaft 131. When the upper steering shaft 127 and the inner cover shaft 125 are inserted into the dash board 150, the insertion of the steering wheel 100 and/or steering column 110 may be finished with or limited by the cover pad 117 and an end of the cover housing 123.

The cover pad 117 may limit the sliding distance or movement of the steering wheel 100 and/or steering column 110 when the steering column 110 contracts, and may enable close contact with the cover housing 123 by the elastic member 155 when the steering column 110 has fully contracted to prevent from entering foreign substances into the cover housing 123.

Figure 5:
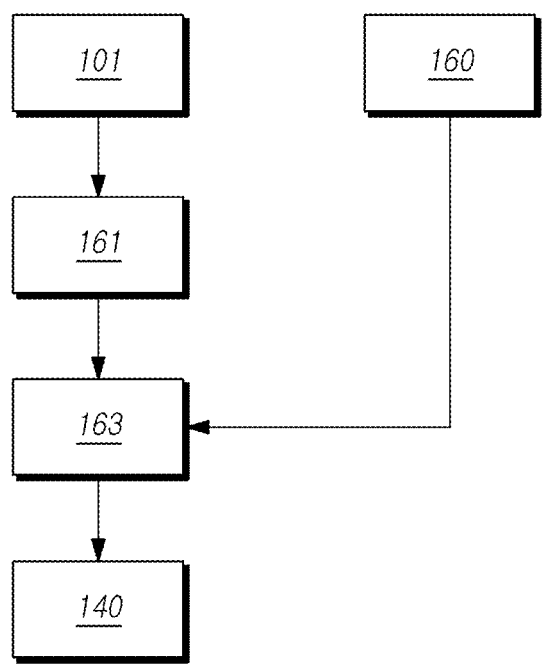
FIG. 5 is a diagram schematically showing the configuration of a steering column according to embodiments of the present disclosure.
Figure 6:
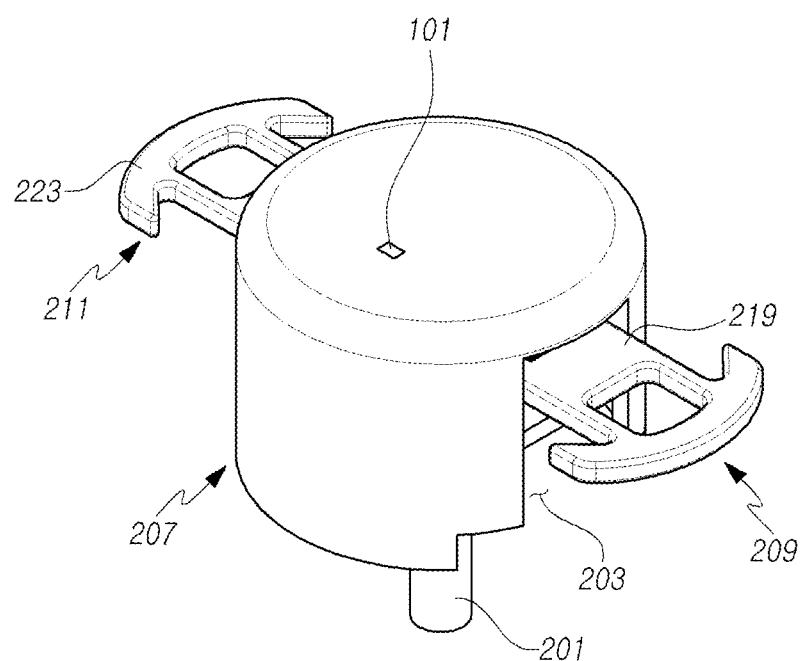
FIGS. 6 and 7 are perspective views showing an example in which movable partial wheels stretch out of a housing of a steering wheel according to embodiments of the present disclosure.
Figure 7:
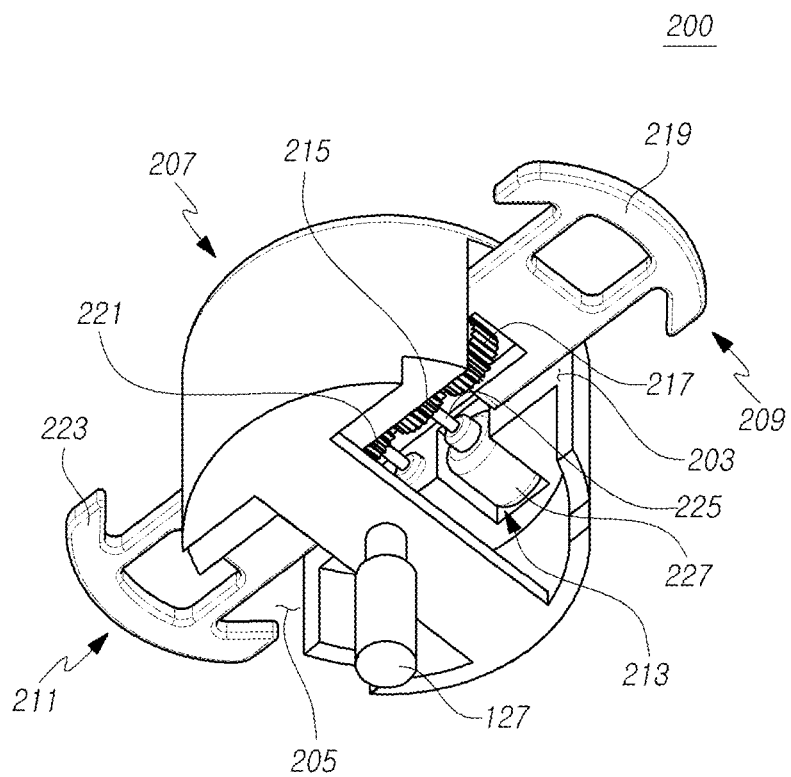
Figure 8:
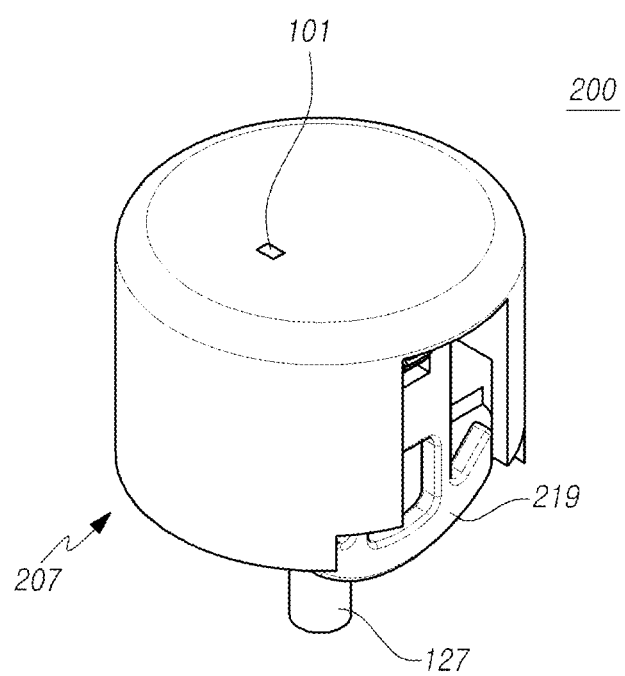
FIGS. 8 and 9 are perspective views showing an example in which movable partial wheels contract in a housing of a steering wheel according to embodiments of the present disclosure.
Figure 9:
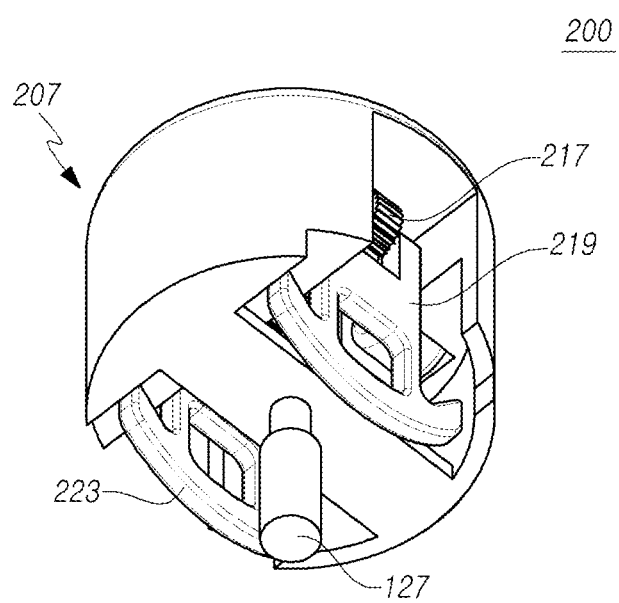

Referring to FIG. 5, the steering column 110 according to embodiments of the present disclosure may further include: an operation switch 101 disposed on the steering wheel 100 combined with the upper steering shaft 127 to be operated in a pressing direction; a sensor 161 sensing the number of times of pressing, operation intensity, and operation time of the operation switch 101; and a controller 163 operating the driving motor 140 in a forward direction or a backward direction, depending on the number of times of pressing input from the sensor 161, and operating the driving motor 140 for operation time input from the sensor 161 when an operation intensity value is larger than a predetermined operation value by comparing the operation intensity value input from the sensor 161 and the predetermined operation value with each other.

The operation switch 101 is operated in a pressing direction, so, for example, the steering column 110 can be contracted when the operation switch 101 is operated once in the pressing direction and can be stretched when the operation switch 101 is operated twice in the pressing direction.

The operation value set in advance in the controller 163 is provided to prevent a mistake of a driver, and when the operation switch 101 is pressed unintentionally to contract or stretch the steering column 110, the driving motor 140 is not operated.

That is, an operation intensity value sensed by intended operation by a driver is set as the operation value in the controller 163 such that when the operation switch 101 is operated with intensity smaller than an operation intensity value sensed by intended operation by a driver, the driving motor 140 is not operated and the steering column 110 is not contracted and stretched. Accordingly, when an operation intensity value smaller than the operation value is input, it is determined as mis-operation and the driving motor 140 is not operated.

The operation switch 101 may be disposed on steering wheels 100, 200, and 300 for the operational convenience for a driver, but is not limited thereto and may be disposed on the door trim at the driver's seat of a vehicle, so detailed description is not provided.

The sensor 161 senses and transmits the number of times of pressing of the operation switch 101 to the controller 163 and the controller 163 determines the rotational direction of the driving motor 140 by finding out the driver's intention to contract or stretch the steering column 110 from the input number of times of pressing.

Further, the sensor 161 senses and transmits the operation intensity and operation time of the operation switch 101 pressed by a driver to the controller 163 and the controller 140 operates the driving motor 140 on the basis of the input operation intensity and operation time.

Accordingly, in this case, the driving motor 140 is operated in accordance with the operation time of the operation switch 101 pressed by the driver and the contracting or stretching distance of the steering column 110 is also increased in proportion to the operation time by the driver.

When the operation intensity value input from the sensor 161 is the same as or larger than a predetermined maximum operation value, the controller 163 operates the driving motor 140 such that the guide protrusion 122 of the inner housing 121 is moved to an end or the other end of the guide hole 128 of the control housing 129, whereby the steering column 110 is maximally stretched or contracted.

The maximum operation value set in the controller 163 means an operation intensity value sensed by intended operation by the driver in which the driver presses the operation switch 101 stronger than a normal state to maximally stretch or contract the steering column 110 and the operation intensity value is set as the maximum operation value. Accordingly, when the operation intensity value by the driver is the same as or larger than the predetermined maximum operation value, the driving motor 140 is operated to maximally stretch or contract the steering column 110.

When the operation intensity value input from a sensor is smaller than the predetermined maximum operation value, the controller 163, as described above, operates the driving motor 140 in accordance with the operation intensity and operation time by the driver pressing the operation switch 101.

Accordingly, in this case, the driving motor 140 is operated in accordance with the operation time of the operation switch 101 pressed by the driver and the contracting or stretching distance of the steering column 110 is also increased in proportion to the operation time by the driver.

The steering column 110 according to embodiments of the present disclosure may further include an ignition switch 160 that transmits an ignition-on or ignition off state of an engine to the controller 163.

In this case, when a signal input from the ignition switch 160 changes from On to Off or from Off to On, the controller 163 operates the driving motor 140 such that the guide protrusion 122 is moved to an end or the other end of the guide hole 128, whereby the steering column 110 is maximally contracted or stretched.

That is, when the signal input from the ignition switch 160 changes from On to Off or from Off to On, it means that the driver stops driving the vehicle and has no intention to driver any more or the driver has intention to start driving the vehicle, so the driving motor 140 is operated such that the steering column 110 is maximally contracted or stretched.

When the signal input from the ignition switch 160 maintains the On-state, the controller 163 maintains the driving motor 140 in a stop state even if a pressing signal is input from the sensor 161.

That is, when the driver maintains the ignition switch 160 in the On-state, it means that the vehicle is being driven, so if the steering column 110 is contracted or stretched when the vehicle is being driven, a safety accident may occur.

Accordingly, when the signal input from the ignition switch 160 maintains the On-state, the controller 163 does not operate the driving motor 140 such that the steering column 110 is not contracted or stretched even if the driver operates the operation switch 101.

Further, it is possible to achieve a specific operation state of the steering column 110 according to embodiments of the present disclosure when a vehicle is in a self-driving mode.

For example, for a self-driving mode of a vehicle, a specific self-driving mode switch may be installed such that when a driver turns on the self-driving mode switch even if the signal input from the ignition switch 160 is in On-state, the steering column 110 is contracted into the dashboard in order for the driver to be able to more widely use the space around the driver's seat.

Referring to FIGS. 6 to 15, a steering wheel 200 according to embodiments of the present disclosure includes: a housing 207 connected to the upper steering shaft 127 of a vehicle and having a first opening 203 and a second opening 205 on both sides; a first movable partial wheel 209 and a second movable partial wheel 211 configured to be inserted into and protruded out of the housing 207 through the first opening 203 and the second opening 205; and a wheel actuator 213 disposed in the housing 207 and combined with the first movable partial wheel 209 and the second movable partial wheel 211 to provide a driving force.

The housing 207, which is connected to the upper steering shaft 127 of a vehicle, for example, is formed in a substantially hollow cylindrical shape and the upper steering shaft 127 of a vehicle is connected to the bottom of the housing 207.

The first opening 203 and the second opening 205 are formed on both sides of the housing 207, respectively.

The first movable partial wheel 209 is rotatably supported at a side in the housing 207 and is inserted into and protruded out of the housing 207 through the first opening 203.

An example of the configuration of the first movable partial wheel 209 is described in more detail. The first movable partial wheel 209 includes a first rotary shaft 217a rotatably supported on a side in the housing 207; a first driven gear 217 fitted on the first rotary shaft 217a and engaged with a wheel driving gear 215 to be described below; and a first grip 219 combined with the first rotary shaft 217a to be inserted into and protruded out of the housing 207 through the first opening 203, depending on the rotational direction of the first rotary shaft 217a.

The first rotary shaft 217a is rotatably supported on a side in the housing 207, and though not shown in the drawings, the first rotary shaft 217a can be rotatably supported by a bearing inserted and fixed on an inner side of the housing 207.

The first driven gear 217 is fitted on the first rotary shaft 217a and is engaged with the wheel driving gear 215 to be described below.

According to this configuration, rotational motion of the wheel driving gear 215 is transmitted to the first driven gear 217, so the first rotary shaft 217a is rotated.

The first grip 219 is combined with the first rotary shaft 217a, so when the first rotary shaft 217a is rotated, the first grip 219 is rotated about the first rotary shaft 217a.

That is, the first grip 219 is inserted into and protruded out of the housing 207 through the first opening 203, depending on the rotational direction of the first rotary shaft 217a.

The second movable partial wheel 211 is rotatably supported on the other side in the housing 207 and is inserted into and protruded out of the housing 207 through the second opening 205.

An example of the configuration of the second movable partial wheel 211 is described in more detail. The second movable partial wheel 211 includes a second rotary shaft 222a rotatably supported on the other side in the housing 207; a second driven gear 222 fitted on a second rotary shaft 222*a* and engaged with a connecting gear 221 to be described below; and a second grip 223 combined with the second rotary shaft 222*a* to be inserted into and protruded out of the housing 207 through the second opening 205, depending on the rotational direction of the second rotary shaft 222*a*.

The second rotary shaft 222*a* is rotatably supported on the other side in the housing 207, and though not shown in the drawings, the second rotary shaft 222*a* can be rotatably supported by a bearing inserted and fixed on the other inner side of the housing 207.

The second driven gear 222 is fitted on the second rotary shaft 222*a* and is engaged with the connecting gear 221.

The connecting gear 221 is rotatably supported in the housing 207 and is engaged with the wheel driving gear 215.

That is, the connecting gear 221 connects the wheel driving gear 215 and the second driven gear 222 such that the rotational direction of the second driven gear 222 becomes the same as the rotational direction of the wheel driving gear 215.

The second grip 223 is combined with the second rotary shaft 222*a*, so when the second rotary shaft 222*a* is rotated, the second grip 223 is rotated about the second rotary shaft 222*a*.

That is, the second grip 223 is inserted into and protruded out of the housing 207 through the second opening 205, depending on the rotational direction of the second rotary shaft 222*a*.

The wheel actuator 213 is disposed in the housing 207 and provides a rotational driving force to the first movable partial wheel 209 and the second movable partial wheel 211.

An example of the wheel actuator 213 is described in more detail. The wheel actuator 213 is coupled and fixed in the housing 207 and includes a wheel driving motor 227 having a rotary driving shaft 225 and a wheel actuator gear 215 fitted on the driving shaft 225.

The wheel driving motor 227 is coupled and fixed to the inner side of the housing 207 and may be an electric motor having the driving shaft 225.

The wheel driving gear 215 is fitted on the driving shaft 225 and is engaged with the first driven gear 217 and the connecting gear 221.

Figure 10:
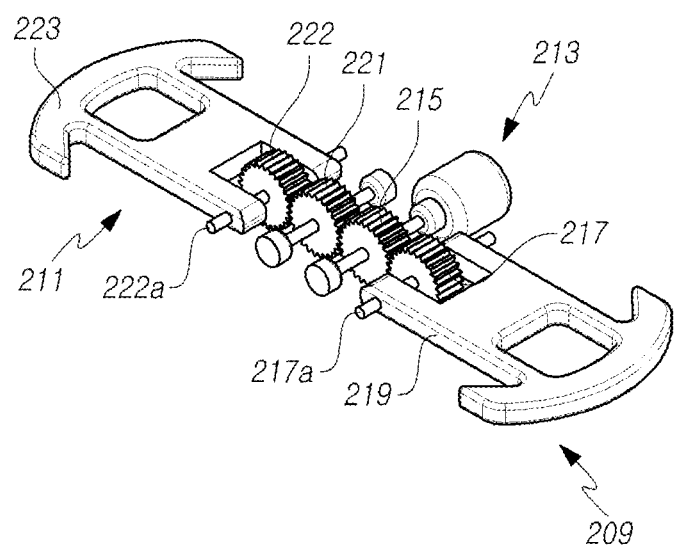
FIGS. 10 and 11 are perspective views showing an operation example of a wheel actuator and the movable partial wheels shown in FIG. 6.
Figure 11:
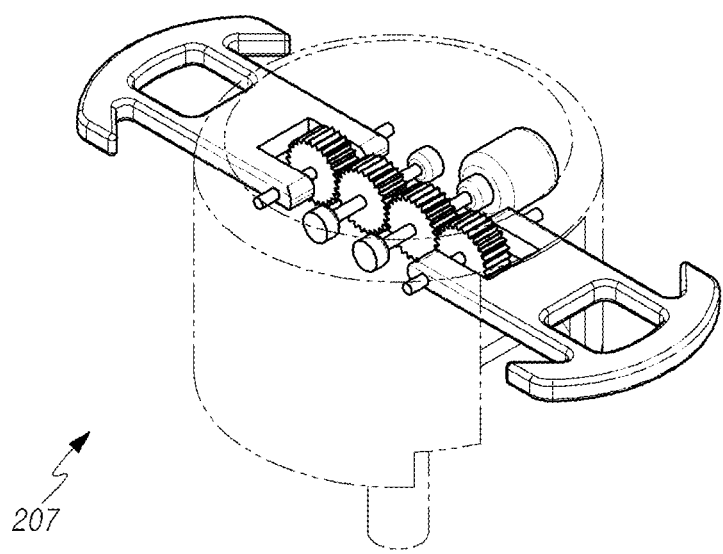

Referring to FIGS. 6 to 10, when the wheel actuator 213 is operated and the wheel driving gear 215 is rotated in a first direction (clockwise in FIG. 10), the first driven gear 217 is rotated in a second direction (counterclockwise in FIG. 10). Accordingly, the first grip 219 is also rotated counterclockwise about the first rotary shaft 217*a*, whereby the first grip 219 is protruded out of the housing 207 through the first opening 203 of the housing 207.

In this process, the connecting gear 221 is rotated counterclockwise and the second driven gear 222 engaged with the connecting gear 221 is rotated clockwise, so the second grip 223 is also rotated clockwise about the second rotary shaft 222*a*. Accordingly, the second grip 223 is protruded out of the housing 207 through the second opening 205 of the housing 207.

That is, when the wheel driving gear 215 is rotated in the first direction (clockwise in FIG. 10), the first grip 219 and the second grip 223 are protruded out of the housing 207.

This operation makes the operation state of the steering wheel in a driver-driving mode of a vehicle.

Figure 14:
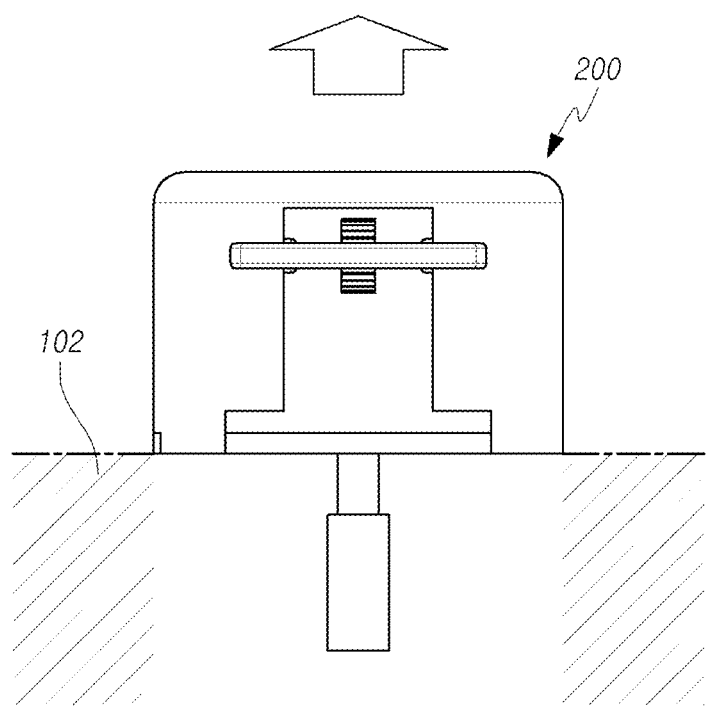
FIG. 14 is a view showing an example in which a steering wheel according to various embodiments of the present disclosure protrudes out of a cockpit module.

That is, as shown in FIG. 14, in a drive-driving mode of a vehicle, the steering wheel 200 of the vehicle protrudes out of the dashboard 102, so a driver can steer with the movable partial wheels 209 and 211 in hands.

Figure 12:
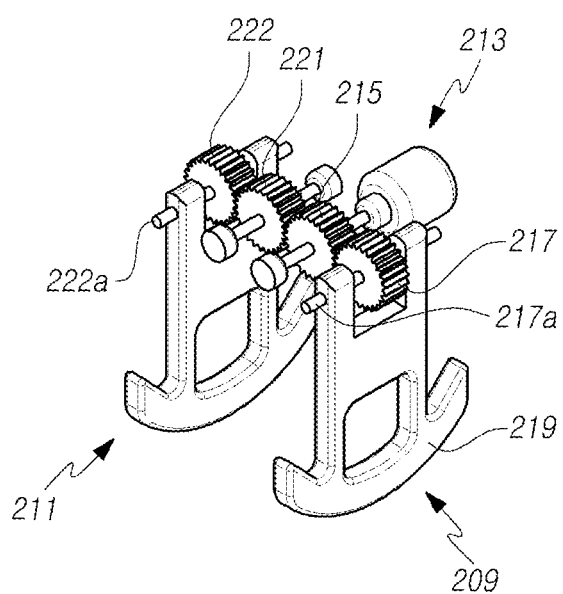
FIGS. 12 and 13 are perspective views showing an operation example of a wheel actuator and the movable partial wheels shown in FIG. 8.
Figure 13:
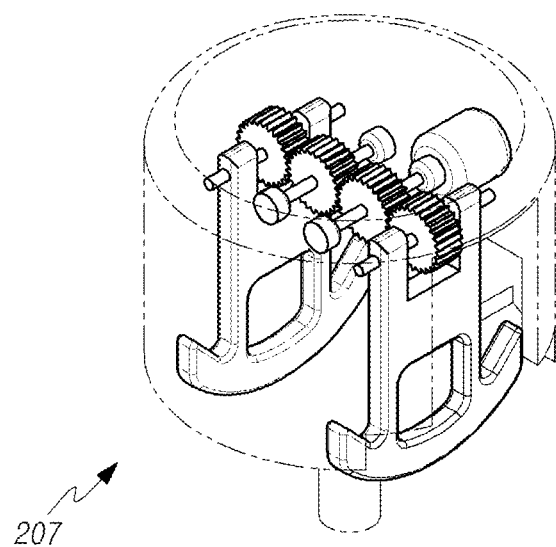

On the contrary, referring to FIGS. 8 to 12, when the wheel actuator 213 is operated and the wheel driving gear 215 is rotated in the second direction (counterclockwise in FIG. 12), the first driven gear 217 is rotated in the first direction (clockwise in FIG. 12). Accordingly, the first grip 219 is also rotated clockwise about the first rotary shaft 217*a*, whereby the first grip 219 is inserted into the housing 207 through the first opening 203 of the housing 207.

In this process, the connecting gear 221 is rotated clockwise and the second driven gear 222 engaged with the connecting gear 221 is rotated counterclockwise, so the second grip 223 is also rotated counterclockwise about the second rotary shaft 222*a*. Accordingly, the second grip 223 is inserted into the housing 207 through the second opening 205 of the housing 207.

That is, when the wheel driving gear 215 is rotated in the second direction (clockwise in FIG. 12), the first grip 219 and the second grip 223 are inserted into the housing 207.

This operation makes the operation state of the steering wheel in a self-driving mode of a vehicle.

Figure 15:
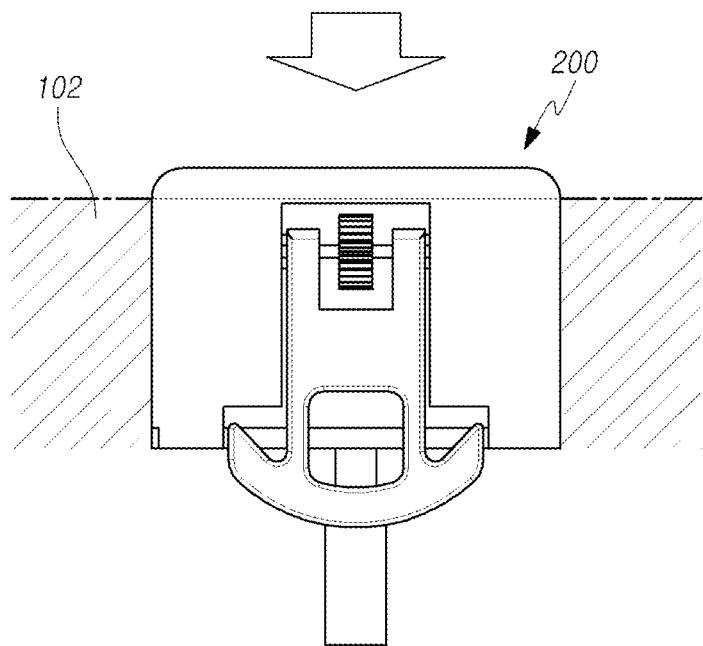
FIG. 15 is a view showing an example in which a steering wheel according to various embodiments of the present disclosure is inserted in a cockpit module.
Figure 16:
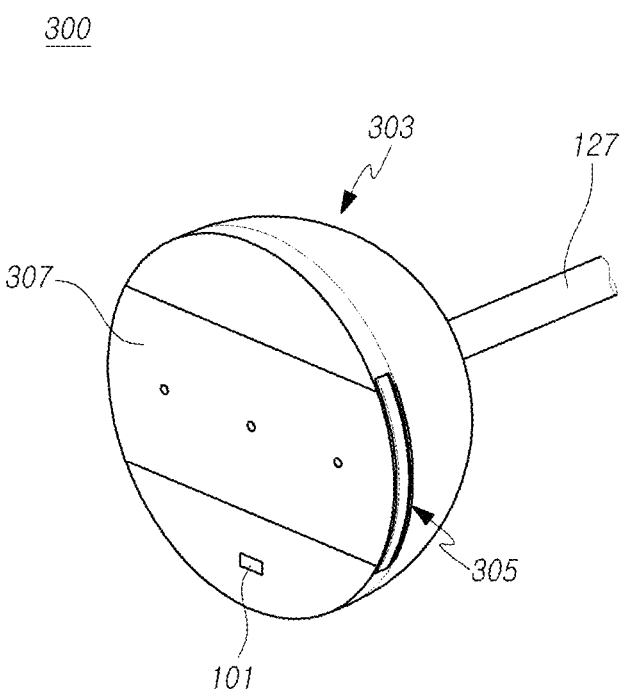
FIG. 16 is a view showing the state in which a movable partial wheel is stowed in a housing of a steering wheel according to embodiments of the present disclosure.
Figure 17:
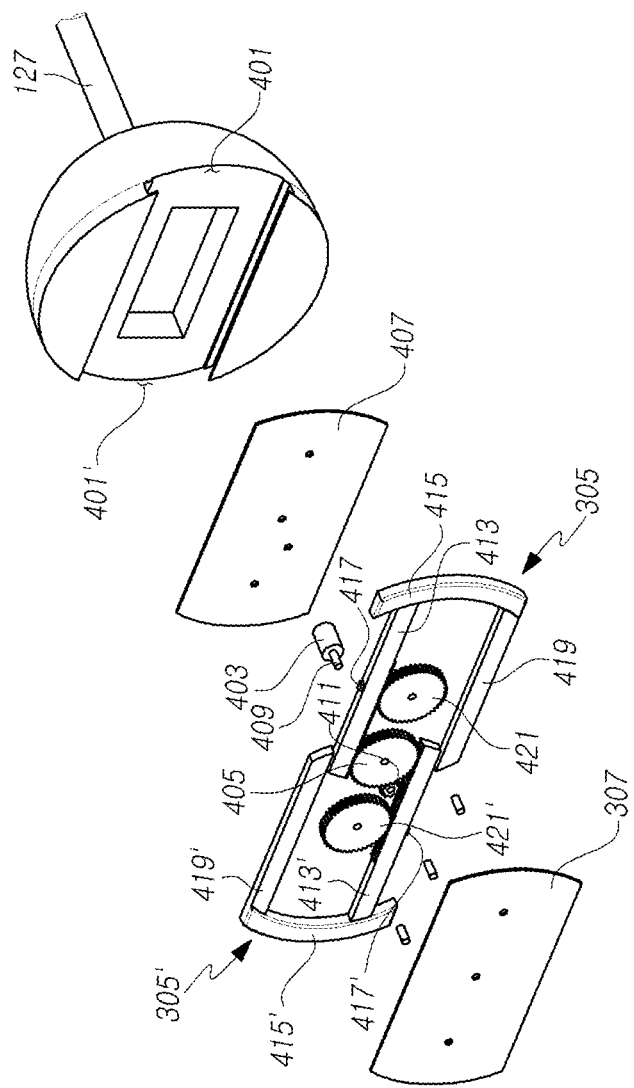
FIG. 17 is an exploded perspective view of FIG. 16.
Figure 18:
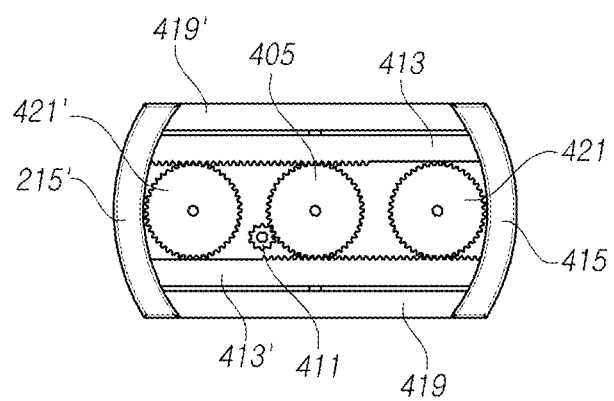
FIG. 18 is a view showing the positions of a wheel driving gear assembly and a movable partial wheel shown in FIG. 16.
Figure 19:
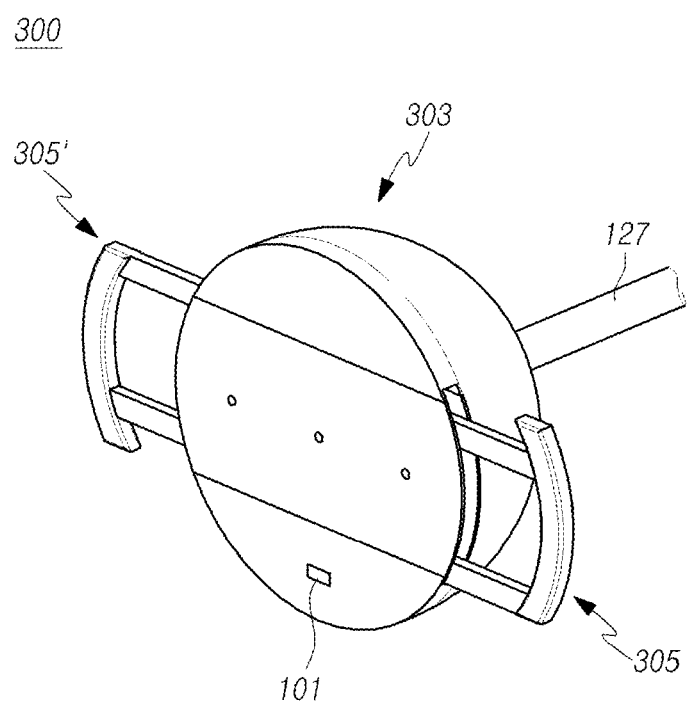
FIG. 19 is a view showing the state in which a movable partial wheel protrudes out of a housing of a steering wheel according to embodiments of the present disclosure.
Figure 20:
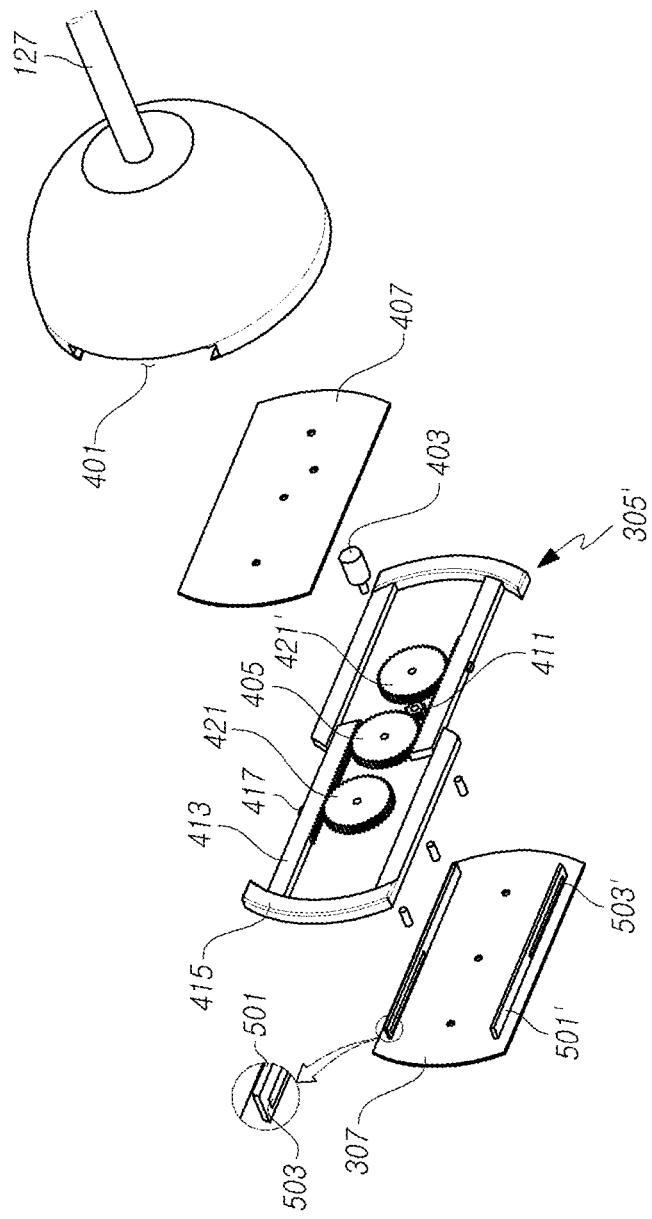
FIG. 20 is an exploded perspective view of FIG. 18.
Figure 21:
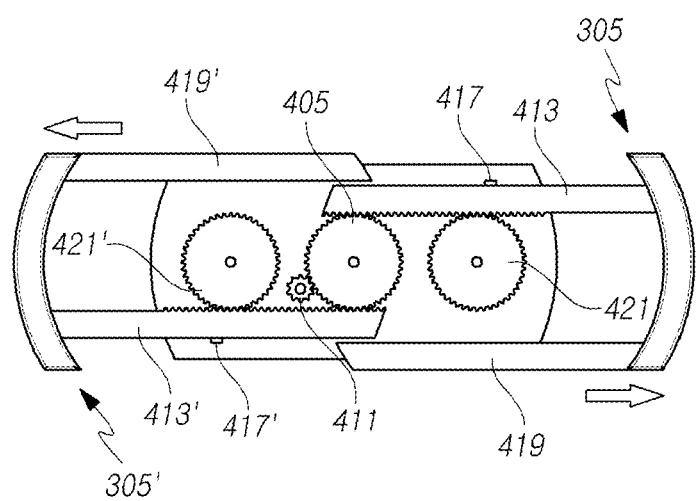
FIG. 21 is a view showing the positions of a wheel driving gear assembly and a movable partial wheel shown in FIG. 19.

That is, as shown in FIG. 15, in a self-driving mode of a vehicle, the steering wheel 200 of the vehicle inserted in the dashboard 102, so a driver can more widely use the space around the driver's seat.

On the other hand, referring to FIGS. 16 to 23, a steering wheel 300 according to embodiments of the present disclosure includes: a housing 303 connected to the upper steering shaft 127 of a vehicle and having a first opening 401 and a second opening 401' on both sides; a first movable partial wheel 305 and a second movable partial wheel 305' configured to be inserted into and protruded out of the housing 303 through the first opening 401 and the second opening 401'; and a wheel actuator 403 disposed in the housing 303 and combined with the first movable partial wheel 305 and the second movable partial wheel 305' to provide a driving force.

The housing 303 is connected to the upper steering shaft 127 of a vehicle and has the first opening 401 and the second opening 401' on both sides of the housing 303.

The first movable partial wheel 305 and the second movable partial wheel 305' are respectively disposed on both sides of the housing 303 in pair.

The wheel driving gear 405 is disposed in the housing 303 and is rotated by the wheel actuator 403.

The wheel driving gear 405 is rotatably combined with a rear plate 407 combined with the housing 303 and is engaged with a gear 411 fitted on a rotary shaft 409 of the wheel actuator 403 fixed and supported to the rear plate 407 such that a rotational driving force of the wheel actuator 403 is transmitted to the wheel driving gear 405 through the gear 411.

The first movable partial wheel 305 and the second movable partial wheel 305' are engaged with the wheel driving gear 405 and are moved in accordance with a rotational direction of the wheel driving gear 405, so the distances protruding through the first opening 401 and the second opening 401' are changed.

An example of the configuration of the first movable partial wheel 305 and the second movable partial wheel 305' is described in more detail. The first movable partial wheel 305 and the second movable partial wheel 305' have: movable rods 413 and 413' having teeth on the surfaces facing the wheel driving gear 405 to be engaged with the wheel driving gear 405; and a first grip 415 and a second grip 415' formed at ends of the movable rods 413 and 413'.

The movable rods 413 and 413' are, for example, formed in long bar shapes and teeth are formed on the surfaces, which face the wheel driving gear 405, of surfaces of the movable rods 413 and 413'.

The teeth are fitted to the wheel driving gear 405 so that the movable rods 413 and 413' can be moved straight in a first direction or a second direction, depending on rotation of the wheel driving gear 405.

A supporting gear 421 engaged with the teeth of the movable rods 413 and 413' are further rotatably combined with the rear plate 407. Since the supporting gear 412 is provided, the movable rods 413 and 413' are more stably supported when they are moved in the first direction or the second direction of left and right.

The movable rods 413 and 413' may have stopper protrusions 417 that protrude from surfaces opposite the surfaces facing the wheel driving gear 405 and limits the movement distances of the movable rods 413 and 413'.

The stopper protrusions 216 are inserted in slots 503 formed at guide plates 501 of a cover plate 307 to be described below.

The first grip 415 and the second grip 415' are formed at ends of the movable rods 413 and 413'. The first grip 415 and the second grip 415' are parts that a driver holds with hands for steering in a manual driving mode.

The first grip 415 and the second grip 415' are may be formed in rounded bar shapes.

The first movable partial wheel 305 and the second first movable partial wheel 305' may have extension rods 419 disposed in parallel with the movable rods 413 and 413' opposite to the movable rods 413 and 413' with the wheel actuator 405 therebetween and having ends connected to the first grip 415 and the second grip 415'.

In embodiments of the present disclosure, the housing 303 includes the cover plate 307 that covers the wheel driving gear 405 and the movable rods 413 and 413' and includes the guide plates 501 having the slots 503 in which the stopper protrusions 417 are inserted and moved within a predetermined range.

The cover plate 307 is a flat plate and functions as a cover that covers the wheel driving gear 405 and the movable rods 413 and 413'.

The guide plates 501 are formed on the cover plate 307 and protrudes from a rear side (facing the wheel driving gear 405) of the cover plate 307 and the slots 503 having a predetermined length are formed at the guide plates 501.

The stopper protrusions 417 are inserted in the slots 503.

Accordingly, since the stopper protrusions 417 of the movable rods 413 and 413' can be moved only to ends or the other ends of the slots 503, when the movable rods 413 and 413' are moved in a first direction of a second direction by rotation of the wheel driving gear 405 and a manual driving mode or a self-driving mode is entered, the movement amount of the movable rods 413 and 413' can be mechanically adjusted.

Obviously, as shown in the drawings, the movable rods 413 and 413' are disposed opposite each other with the wheel driving gear 405 therebetween. Further, the extension rods 419 and 419' are disposed outside the movable rods 413 and 413'.

The slots 503 and 503' are also symmetrically formed.

Figure 22:
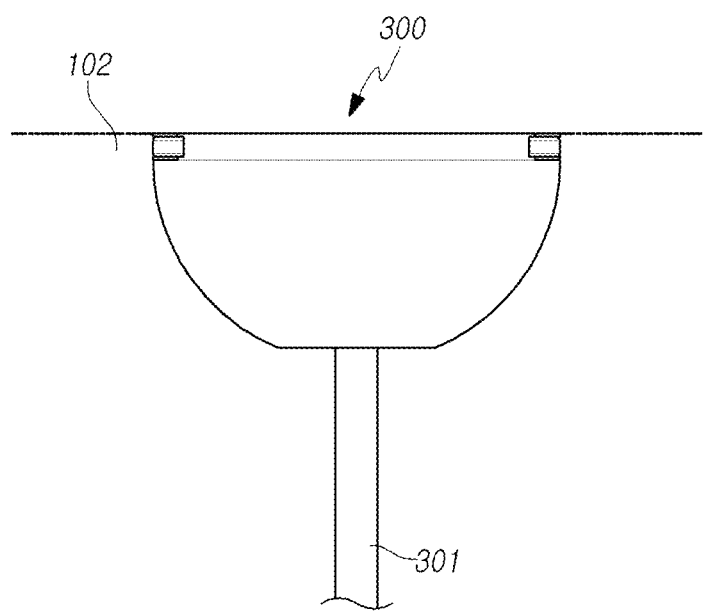
FIG. 22 is a view showing the state of a steering wheel in a self-driving mode.
Figure 23:
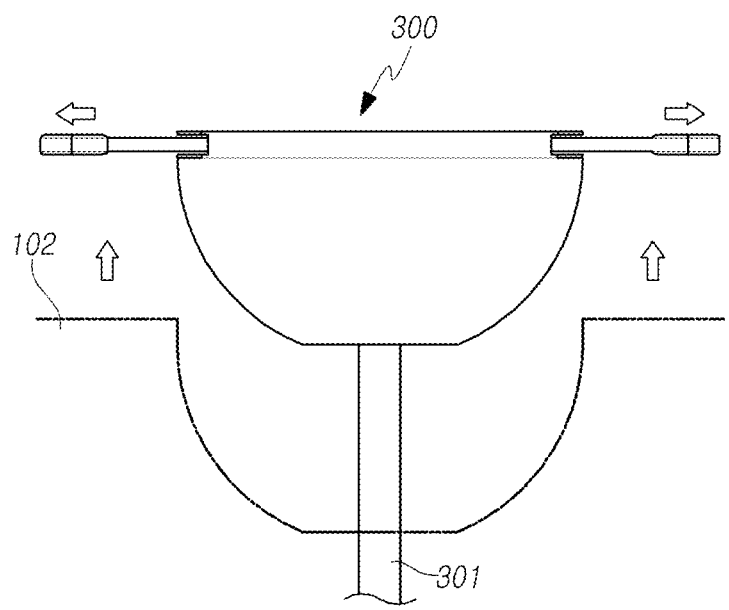
FIG. 23 is a view showing the state of a steering wheel in a manual driving mode.

Meanwhile, as shown in FIG. 22, in the self-driving mode of a vehicle, the steering wheel 300 of the vehicle is stowed in the dashboard 102 with the first movable partial wheel 305 and the second movable partial wheel 305' maximally inserted in the housing 303. Further, as shown in FIG. 23, in the manual driving mode of a vehicle, the steering wheel 300 of a vehicle is protruded out of the dashboard 102 with the first movable partial wheel 305 and the second movable partial wheel 305' maximally protruded out of the housing 303.

According to these embodiments, in accordance with necessity of a driver, a steering column is protruded out of a dashboard and a steering wheel is moved to a position where it can be operated by the driver or, the steering column is inserted into the dashboard and the steering wheel is moved close to the dashboard. Further, movable partial wheels of a steering wheel are protruded out of the steering wheel in a driver-driving mode, so a driver can steer a vehicle with the movable partial wheels in hand. In addition, movable partial wheels are stowed in a steering wheel in a self-driving mode, so a driver can more widely use the space around the driver's seat.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

The above embodiments have been described merely for the purpose of illustrating the technical idea of the present disclosure, and those skilled in the art will appreciate that various modifications and changes are possible without departing from the scope and spirit of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A steering apparatus for a vehicle, comprising:
   a steering wheel connected to an upper steering shaft, the steering wheel comprising:
      a housing having first and second openings,
      first and second partial wheels configured to be movable to be inserted into or protrude out of the housing through the first and second openings, and
      a wheel actuator disposed in the housing and associated with the first and second partial wheels to provide driving force; and
   a steering column comprising:
      an inner cover shaft coupled to the upper steering shaft connected to the steering wheel,
      an inner housing coupled to the inner cover shaft and having a guide protrusion formed on an outer surface of the inner housing,
      a control housing having a guide slit formed to receive the guide protrusion of the inner housing, and
      a cover housing fixed to the vehicle, wherein the control housing is rotatably disposed in the cover housing.

2. The steering apparatus of claim 1, further comprising:
   a column driving motor configured to rotate the control housing and connected with the cover housing,
   a first gear rotatably coupled to the control housing, and a second gear disposed or formed on a shaft of the column driving motor to rotate the first gear.

3. The steering apparatus of claim 1, wherein the control housing of the steering column further comprises a connection slit connected with the guide slit and formed at an end of the control housing.

4. The steering apparatus of claim 1, wherein one of a fixing protrusion and a fixing groove is formed at the inner cover shaft and the other one of the fixing protrusion and the fixing groove is formed at the upper steering shaft.

5. The steering apparatus of claim 1, wherein one of a locking protrusion and a locking groove is formed at the inner housing and the other one of the locking protrusion and the locking groove is formed at an the inner cover shaft.

6. The steering apparatus of claim 1, further comprising an outer cover shaft having an end disposed between the inner cover shaft and the inner housing such that the inner cover shaft and the inner housing are axially slidable with respect to the outer cover shaft.

7. The steering apparatus of claim 6, further comprising a lower steering shaft disposed in the outer cover shaft, the lower steering shaft associated with the upper steering shaft such that the upper steering shaft is axially slidable with respect to the lower steering shaft, wherein the lower steering shaft is supported by the outer cover shaft.

8. The steering apparatus of claim 7, further comprising an upper stopper formed at the lower steering shaft and a lower stopper formed at the upper steering shaft and associated with the upper stopper to prevent separation of the upper steering shaft from the lower steering shaft.

9. The steering apparatus of claim 1, further comprising a cover pad disposed on an outer surface of the inner cover shaft, wherein the cover pad and the inner housing are connected through an elastic member.

10. The steering apparatus of claim 9, wherein the cover pad is supported by an end of the cover housing when the inner housing slides into the control housing.

11. The steering apparatus of claim 2, further comprising:
an operation switch operated by pressing;
a sensor configured to sensing at least one of the number of times of the pressing, operation intensity, and operation time of the operation switch; and
a controller configured to control a rotation direction of the column driving motor according to the number of times of pressing sensed by the sensor, or operating the column driving motor for the operation time sensed by the sensor when the operation intensity sensed by the sensor is larger than a predetermined operation value.

12. The steering apparatus of claim 1, wherein:
the first and second partial wheels are rotatably supported in the housing,
the wheel actuator provides rotational driving force to the first and second partial wheels, and
the first and second partial wheels are inserted into or protrude out of the first and second openings by rotating.

13. The steering apparatus of claim 12, wherein the wheel actuator comprises:
a wheel driving motor disposed in the housing and including a rotary driving shaft; and
a wheel driving gear coupled to the rotary driving shaft.

14. The steering apparatus of claim 13, wherein the first partial wheel comprises:
a first rotary shaft rotatably disposed in the housing;
a first driven gear disposed on the first rotary shaft and engaged with the wheel driving gear; and
a first grip movably coupled with the first rotary shaft so that the first grip is inserted into or protrudes out of the housing of the steering wheel through the first opening, depending on rotation of the first rotary shaft.

15. The steering apparatus of claim 13, further comprising at least one connecting gear rotatably disposed in the housing and engaged with the wheel driving gear.

16. The steering apparatus of claim 15, wherein the second partial wheel comprises:
a second rotary shaft rotatably disposed in the housing;
a second driven gear disposed on the second rotary shaft and engaged with the at least one connecting gear; and
a second grip movably coupled with the second rotary shaft so that the second grip is inserted into or protrudes out of the housing of the steering wheel through the second opening, depending on rotation of the second rotary shaft.

17. The steering apparatus of claim 1, further comprising a wheel actuator disposed in the housing of the steering wheel and configured to rotate a wheel driving gear,
wherein the first and second partial wheels are engaged with the wheel driving gear so that the first and second partial wheels are inserted into or protrude out of the first and second openings in accordance with rotation of the wheel driving gear.

18. The steering apparatus of claim 17, wherein each of the first and second partial wheels includes: movable rods comprising teeth to be engaged with the wheel driving gear; and first and second grips formed at ends of the movable rods.

19. The steering apparatus of claim 18, wherein at least one of the movable rods has one or more stopper protrusions formed on a surface of the at least one of the movable rods opposite to a surface facing the wheel driving gear, and the stopper protrusion configured to limit movement of the movable rods.

20. The steering apparatus of claim 19, wherein the housing of the steering wheel comprises a cover plate covering the wheel driving gear and the movable rods, the cover plate comprising one or more guide plates having one or more slots, wherein the one or more stopper protrusions are movably disposed in the one or more slots.

* * * * *